March 6, 1951     S. I. BERTELSEN     2,544,522
METHOD OF SECURING MEMBERS WITH A PREDETERMINED
TORQUE BY A COMPOSITE CAP SCREW
Filed May 19, 1945
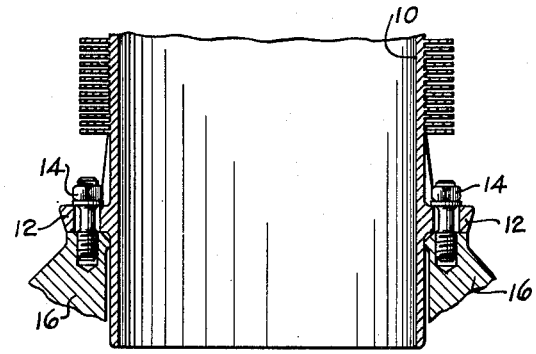
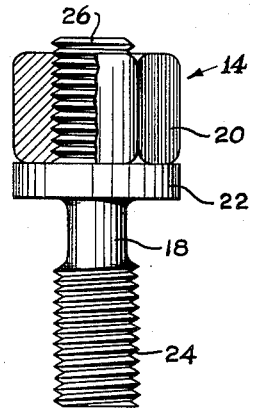
INVENTOR.
SVEND I. BERTELSEN.
BY
ATTORNEY

Patented Mar. 6, 1951

2,544,522

UNITED STATES PATENT OFFICE 2,544,522

METHOD OF SECURING MEMBERS WITH A PREDETERMINED TORQUE BY A COMPOSITE CAP SCREW

Svend Iver Bertelsen, Shrewsbury, Mass., assignor to Wright Aeronautical Corporation, a corporation of New York Application May 19, 1945, Serial No. 594,686

1 Claim. (Cl. 85—1)

This invention relates to cap screws, machine screws, bolts and similar machine elements and is more particularly directed to the construction of such machine elements whereby they may be tightened to a predetermined torque with any standard wrench.

It is well known that for best results cap screws, or the like, should be tightened with a predetermined torque. If the cap screw is not tightened sufficiently, the connection established thereby is subject to failure—for example, because of the relative vibration of the parts connected thereby and if the cap screw is tightened too much, the cap screw, and/or parts connected thereby are overstressed and therefore subject to failure. In order to tighten cap screws or the like with a predetermined torque, it is common practice to use wrenches which indicate the torque applied thereby. However, such wrenches generally are more cumbersome and more expensive than standard wrenches. Also, each such torque-indicating wrench generally only indicates a narrow range of torque, thereby limiting its usefulness. It is an object of this invention to provide a cap screw or similar machine element which is so designed that any standard wrench can be used to apply no more than a predetermined torque thereto.

Specifically, the invention comprises a two-part composite cap screw, bolt machine screw or like machine element in which the two parts are pre-tightened together and the construction is such that the parts automatically loosen when a pre-determined torque is applied for securing a pair of members together and, when said composite machine element is removed from said members, said parts automatically are again tightened together. In this way, the extent to which the parts of the composite machine element are pre-tightened determines the maximum torque which can be applied thereto by any standard wrench.

Other objects of this invention will become apparent upon reading the annexed detailed description in connection with the drawing in which:

Figure 1 is a sectional view of an engine cylinder secured to the engine crankcase by cap screws embodying the invention; and Figure 2 is a detailed view, partly in sections, of one of the cap screws.

Referring first to Figure 1 of the drawing, a cylinder 10 for an internal combustion engine is provided with a flange 12 and cap screws 14 extend through said flange and thread into the engine crankcase 16 to secure or hold down said cylinder to the crankcase. It is common practice to tighten cylinder hold-down cap screws by applying a predetermined torque thereto by means of a torque-indicating wrench. With the cap screw construction of the present invention, as hereinafter described, it is possible to apply a predetermined torque with any standard wrench.

As illustrated in Figure 1, the cap screws 14 secure an engine cylinder to an engine crankcase. However, the cap screws of the present invention are not limited to this specific use since obviously they may be used for securing any two parts together.

The construction of each cap screw 14 is illustrated in detail in Figure 2 and comprises a stem portion 18 and a nut 20. The stem portion 18 is provided with an annular flange 22 spaced from the ends of said stem portion. One end 24 of said stem portion is provided with right-hand threads and the other end 26 of said stem portion is provided with left-hand threads. The nut 20 is provided with left-hand threads adapted to mate with said left-hand threads 26. Prior to use of the cap screw, the nut 20 is threaded on the left-hand threads 26 and is tightened down against the flange 22 with a predetermined torque. Thereupon the nut 20 and stem 18 comprise a composite cap screw assembly which may be used in place of a conventional cap screw and in which the nut and stem portions of the cap screw are pre-tightened together.

With this construction, when right-hand torque is applied to the nut 20, the nut 20 tends to loosen from the flange 22 and the right-hand stem threads 24 tend to pull the flange 22 down against the member to be secured thereby. Similarly, when left-hand torque is applied to the nut 20, this nut tends to tighten against the flange 22 and the right-hand stem threads 24 tend to loosen. Accordingly, the composite cap screw 14 may be tightened into the engine crankcase 16 by means of a standard wrench and, because of the opposite hand of the threads 24 and 26 at the two ends of the cap screw stem portion, when a predetermined right-hand torque is applied, the left-hand nut 20 will break away from the flange 22. In this way, the magnitude of the pre-load between the nut 20 and flange 22 determines the extent to which the cap screw may be tightened.

When the composite cap screw 14 is to be removed, the left-hand nut 20 is threaded down on left-hand threads 26 against the flange 22 and, when a predetermined left-hand torque is imposed on the nut 20, the right-hand threads 24 of the cap screw stem 18 will release from the associated threads in the engine crankcase 16.

Thus, when a composite cap screw 14 is removed or loosened from the engine crankcase, the pre-load between the nut 20 and the flange 22 may be at least approximately restored and if restored the composite cap screw 14 is immediately ready for re-use.

With the aforedescribed construction, a pre-loaded composite cap screw is provided which may be tightened with a standard wrench to remove the pre-load whereupon the composite cap screw is applied with a predetermined torque. In addition, when the composite cap screw is removed, the pre-load may be at least approximately restored. Obviously, it is within the scope of this invention to reverse the hand of the right-hand and left-hand threads 24 and 26 respectively. With this latter arrangement, the composite cap screw would have to be applied with a left-hand torque and would have to be removed with a right-hand torque.

The invention has been described in connection with a so-called cap screw but, obviously, the invention is equally applicable to machine screws, bolts and other machine elements having a threaded portion and a head portion to which a wrench is to be applied for tightening the machine element. Accordingly, the term "screw" as used in the claim, is intended to cover such equivalent machine element forms.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

The method of securing a pair of members together by means of an element having right-hand threads at one end, left-hand threads at its other end and an annular flange between said threads, said method comprising threading a nut on one end of said element down against its flange with a predetermined torque; inserting the other end of said element through a hole in one of said members and into a threaded hole in the other of said members; and then threading said element into said threaded hole by applying torque to said nut to an extent sufficient to cause said nut to loosen from said flange.

S. IVER BERTELSEN.

REFERENCES CITED

The following references are of record in the file of this patent:

UNITED STATES PATENTS

| Number | Name | Date |
|---|---|---|
| 1,321,967 | Woodward | Nov. 18, 1919 |
| 1,438,601 | Kempton | Dec. 12, 1922 |
| 1,526,367 | Parker | Feb. 17, 1925 |
| 1,741,720 | Jolley | Dec. 31, 1929 |
| 1,970,071 | Bengtsson | Aug. 14, 1934 |
| 2,050,464 | Robinson | Aug. 11, 1936 |